UNITED STATES PATENT OFFICE.

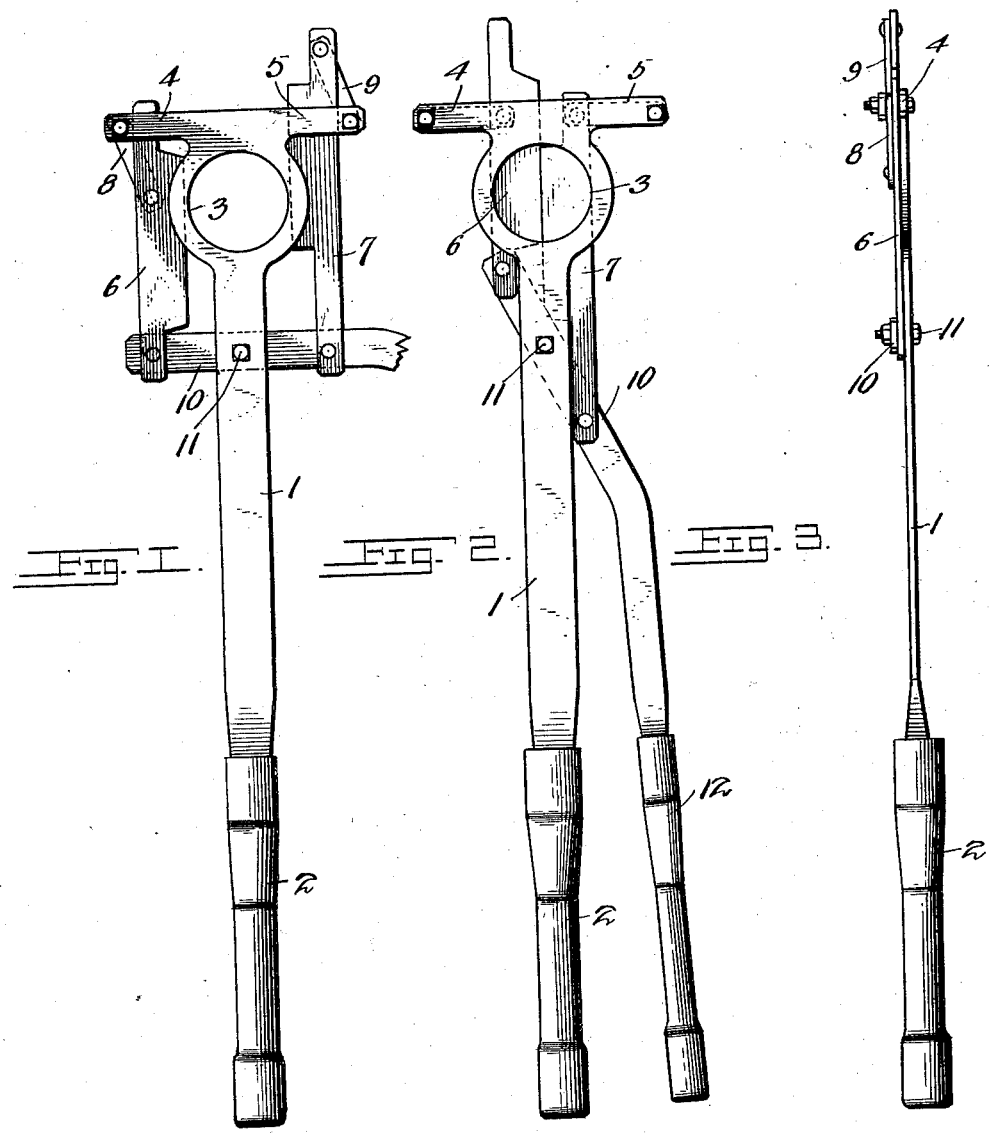

WILLIAM H. THOMPSON, OF CIMARRONE TOWNSHIP, OKLAHOMA TERRITORY.

DEHORNING INSTRUMENT.

SPECIFICATION forming part of Letters Patent No. 685,883, dated November 5, 1901.

Application filed April 18, 1901. Serial No. 56,488. (No model.)

*To all whom it may concern:*

Be it known that I, WILLIAM H. THOMPSON, a citizen of the United States, residing near Coyle, Cimarrone township, in the county of Logan, Territory of Oklahoma, have invented a new and useful Improvement in Dehorning Instruments, of which the following is a specification.

The invention relates to improvements in dehorning instruments.

The object of the present invention is to improve the construction of dehorning instruments and to provide a simple and comparatively inexpensive one adapted to enable the operation of dehorning cattle to be performed with a minimum amount of pain to the animal and with great facility and despatch and capable of making a smooth clean cut at the skull of the animal without bruising or otherwise injuring the same.

A further object of the invention is to provide a device of this character which will leave the skull in a condition that will prevent any further growth of the horns.

The invention consists in the construction and novel combination and arrangement of parts hereinafter fully described, illustrated in the accompanying drawings, and pointed out in the claims hereto appended.

In the drawings, Figure 1 is a front elevation of a dehorning instrument constructed in accordance with this invention, the blades being open. Fig. 2 is a similar view, the blades being closed. Fig. 3 is a side elevation.

Like numerals of reference designate corresponding parts in all the figures of the drawings.

1 designates a bar provided at its inner end with a suitable grip or handle 2 and having a circular opening 3 near its outer end, which is provided with a pair of laterally-extending arms 4 and 5. The circular opening, which is adapted to receive the horn of the animal, is preferably formed by a ring, as clearly illustrated in Figs. 1 and 2 of the accompanying drawings; but the outer portion of the bars or members may be of any other desired configuration. The horn of an animal is cut close to the skull by means of a pair of longitudinally-disposed blades 6 and 7, connected at their outer ends with the arms 4 and 5 by links 8 and 9 and located at opposite sides of and beyond the circular opening 3 when open, as clearly illustrated in Fig. 1 of the accompanying drawings. The inner ends of the blades are connected with the arms of an operating-lever 10, fulcrumed near one end on the bar or member 1 by a bolt 11 or other suitable pivot and provided at its other end with a grip or handle 12.

The operating-lever has its inner and outer portions arranged at a slight angle to each other, as clearly shown in Fig. 2, and the ends of the knives or blades are provided with arms, which are extended beyond the cutting edges and which are pivoted to the links 8 and 9 and to the operating-lever. When the blades are open, as shown in Fig. 1, the link 8, which has its outer end pivoted to the arm 4, extends inward longitudinally of the device at a slight angle to the bar or member 1. The other link, which has its inner end pivoted to the arm 5, extends outward from the said arm and is arranged at an angle to the bar or member 1, similar to the said link. The inner ends of the knives or blades are pivoted equidistant of the bar or member, and the outer portion of the operating-lever is arranged transversely of and at right angles to the bar or member 1 when the knives or blades are open, as illustrated in Fig. 1. When the operating-lever is moved from the position illustrated in Fig. 1 to that shown in Fig. 2, the knives or blades are reciprocated diagonally and are caused to make a draw or shear cut, and the links, which extend from opposite sides of the arms 4 and 5 when the knives or blades are open, are swung to a position parallel with the arms, as illustrated in Fig. 2 of the drawings. The blades are supported by the guide-ring and by the arms, and they are adapted to cut a horn close to the skull and, if necessary, to remove a portion thereof, and they are capable of making a smooth clean cut without bruising, crushing, or otherwise injuring the skull. The guide-opening centers the device on a horn, and the removal of the latter may be effected completely with great despatch and convenience and with a minimum amount of pain to the animal.

What I claim is—

1. A dehorning device comprising a bar or member having an opening to receive a horn, a lever fulcrumed on the bar or member and extending from opposite sides of the same, knives or blades pivoted at one end to the arms of the lever at opposite sides of the fulcrum thereof, and links connected with the blades and with the bar or member, substantially as described.

2. A dehorning device comprising a bar or member having a circular guide-opening adapted to receive a horn, knives or blades located at opposite sides of the opening, links connecting the blades with the bar or member, and an operating-lever fulcrumed on the bar or member and extending from opposite sides thereof and connected with the blades or knives, substantially as described.

3. A dehorning device comprising a bar or member having an opening, knives or blades arranged at opposite sides of the opening, and means for simultaneously reciprocating the knives diagonally and longitudinally in directions opposite to each other, substantially as described.

4. A dehorning device comprising a bar or member having an opening, the reversely-movable knives or blades capable of diagonal reciprocation in opposite directions the links pivoted to the bar or member and extending therefrom in opposite directions and connected to the blades or knives, and the operating-lever extending from opposite sides of the bar or member and connected with the knives or blades, substantially as described.

5. A dehorning device comprising a bar or member provided at its outer end with arms and having a circular horn-receiving opening, the reversely-removable reciprocatory blades, the links pivoted to and extending in opposite directions from the arms and connected with the outer ends of the blades, and the lever extending from opposite sides of the bar or member, and connected with the inner ends of the blades, substantially as described.

In testimony whereof I have signed my name to this specification in the presence of two subscribing witnesses.

WILLIAM H. THOMPSON.

Witnesses:
   GEO. FOSTER,
   CARL L. RICE.